United States Patent [19]

Behr

[11] Patent Number: 4,823,442

[45] Date of Patent: Apr. 25, 1989

[54] HOSE CLAMP

[75] Inventor: Charles Behr, Brighton, Mich.

[73] Assignee: Gagnier Products Company, Oak Park, Mich.

[21] Appl. No.: 165,244

[22] Filed: Mar. 7, 1988

[51] Int. Cl.⁴ .............................................. B65D 63/02
[52] U.S. Cl. .................................... 24/20 R; 24/16 PB
[58] Field of Search .............. 24/20 R, 20 CW, 23 W, 24/16 PB, 17 AP, 30.5 P, 19, 580, 286; 248/74.3

[56] References Cited

U.S. PATENT DOCUMENTS

| | | | |
|---|---|---|---|
| 1,000,992 | 8/1911 | Copper | 24/286 |
| 1,003,907 | 8/1911 | Hoffman . | |
| 2,424,656 | 7/1947 | Goldblatt . | |
| 2,495,667 | 1/1950 | Vizner . | |
| 2,935,773 | 5/1960 | Weckesser . | |
| 3,385,299 | 5/1968 | Le Roy . | |
| 3,860,997 | 1/1975 | Van Riper, Jr. et al. | 24/16 PB |
| 3,922,758 | 12/1975 | Wunnenberg et al. | 24/16 PB |
| 4,221,030 | 9/1980 | Bernede | 24/16 PB |
| 4,263,697 | 4/1981 | Speedie . | |
| 4,299,012 | 11/1981 | Oetiker | 24/19 |
| 4,377,879 | 3/1983 | Christo | 248/74.3 |
| 4,468,840 | 9/1984 | Sauer et al. | 24/20 R |
| 4,477,950 | 10/1984 | Cisek et al. . | |
| 4,567,626 | 2/1986 | Kimbrough . | |
| 4,577,375 | 3/1986 | Beaussant | 24/580 |
| 4,631,782 | 12/1986 | Gecs | 24/17 AP |
| 4,637,100 | 1/1987 | Ishihata | 24/20 R |

FOREIGN PATENT DOCUMENTS 2139091 3/1972 Fed. Rep. of Germany ... 24/16 PB
7421081 3/1976 France .

Primary Examiner—Victor N. Sakran
Attorney, Agent, or Firm—Harness, Dickey, Pierce

[57] ABSTRACT

A hose clamp having an elongated strip and a clasp is disclosed. The strip has a projecting member for enabling positioning of the clasp upon the strip. Barb members are formed on the longitudinal edges of the strip to enable locking of the strip within the clasp. The clasp includes finger members projecting therefrom to sandwich the strip between the clasp finger members and strip projecting member to lock the strip's barbs against the clasp's barbs to retain the strip in the clasp when the strip is in a use position.

8 Claims, 2 Drawing Sheets

HOSE CLAMP

BACKGROUND AND SUMMARY OF THE INVENTION

The present invention relates to hose clamps and, more particularly, to hose clamps with projecting finger members and retaining barbs within the clasp or grip to sandwich and retain the clamp's elongated strip within the clasp in a use position.

Several type of hose clamps or the like exist in the art and have been utilized for various applications. The following patents illustrate clamps in the art. They are U.S. Pat. Nos. 1,003,907; 2,424,656; 2,495,667; 2,935,773; 3,385,299; 3,860,997; 4,263,697; 4,377,879; 4,477,950; 4,567,626; 4,577,375; and French Pat No. 7421081. While these clamps are satisfactory for their particular applications, designers are always looking for other solutions.

The present invention provides the art with a hose clamp which includes a clasp or grip housing on an elongated strip. The housing includes a pair of side walls and a top spanning the side walls enclosing the housing. The side walls have one or more barb members to lock or retain the strip within the housing. The strip includes a finger member projecting from the strip. The strip's finger member extends into the housing. The top includes one or more finger members. The finger members suspend from the top into the housing. The strip and top projecting finger members sandwich the strip between the finger members to seat the strip within the housing. This seating enables the strip to mesh with the barbs on the side walls. The barbs lock and retain the strip within the clasp.

Thus, the present invention provides the art with a hose clamp which enables easy securement of the clamp onto a hose or the like. The clamp also enables ready removal of the clamp from the hose or the like. The clamp design provides a friction lock so that ordinarily no tools are needed to secure the clamp onto an article. However, on low clamp load applications, tool are required to tighten the clamp to affect a seal of $\approx 200$ lbs. Further, the clamp may be manufactured from a metallic or plastic material as desired.

From the subsequent detailed description and appended claims taken in conjunction with the drawings, other objects and advantages of the present invention will become apparent to those skilled in the art.

DETAILED DESCRIPTION OF THE PREFERRED EMBODIMENT

Figure 1:
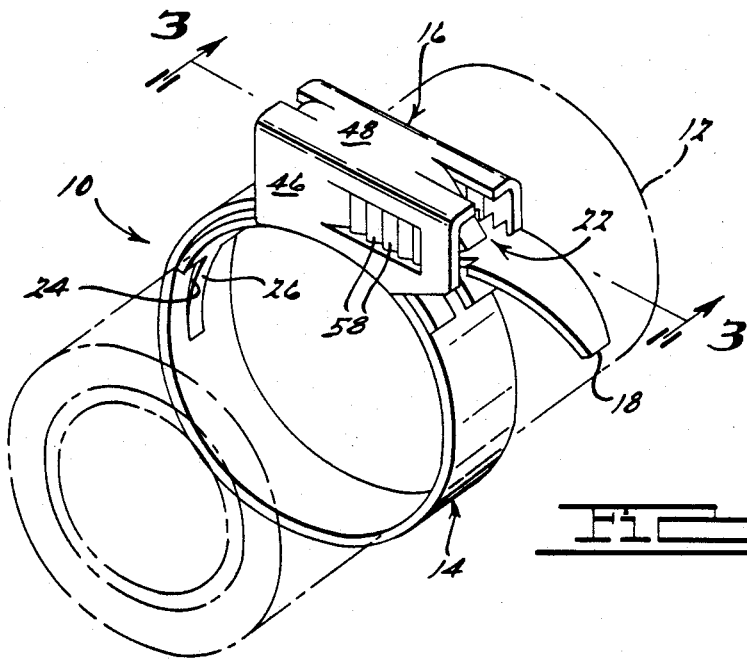
FIG. 1 is a perspective view of a hose clamp in accordance with the present invention.

Turning to the figures, particularly FIG. 1, a clamp is illustrated and designated with the reference numeral 10. The clamp 10 is illustrated positioned on a hose 12. The clamp 10 is comprised of an elongated strip 14 and clasp or grip 16.

The elongated strip 14 includes longitudinal edges 15 and 17 and two ends 18 and 20. A retaining portion 22 is positioned adjacent to end 18. An aperture 24 is formed in the strip 14. The aperture 24 enables end 20 to project through the strip 14 when the strip 14 is in its peripheral use position. A projecting finger member 36 is formed in the strip 14 to enhance the seating of the strip 14 in the clasp 16.

The retaining portion 22 locks the strip 14 within the clasp 16 when the strip is in a peripheral use position. The retaining portion 22 includes a plurality of angular barbs 28 and 30 on both longitudinal edges 15 and 17 of the strip 14. The angular barbs 28 and 30 have a first face 32 and 33. The faces 32 and 33 project at an angle of approximately 45° with respect to the longitudinal axis 25 of the strip 14. A second barb face 34 and 35 is on a line substantially perpendicular to the longitudinal axis 25. The barbs perpendicular faces 34 and 35 mesh with the clasp 16 to retain the strip 14 within the clasp 16, as will be explained herein.

The projecting finger member 36 projects out of the strip 14. The projecting finger member 36 may position the clasp 16 onto the strip 14. The projecting finger member 36 extends into the clasp 16 a desired distance to enable seating of the retaining portion 22 of the strip 14 within the clasp 16, as will be explained herein.

Figure 2:
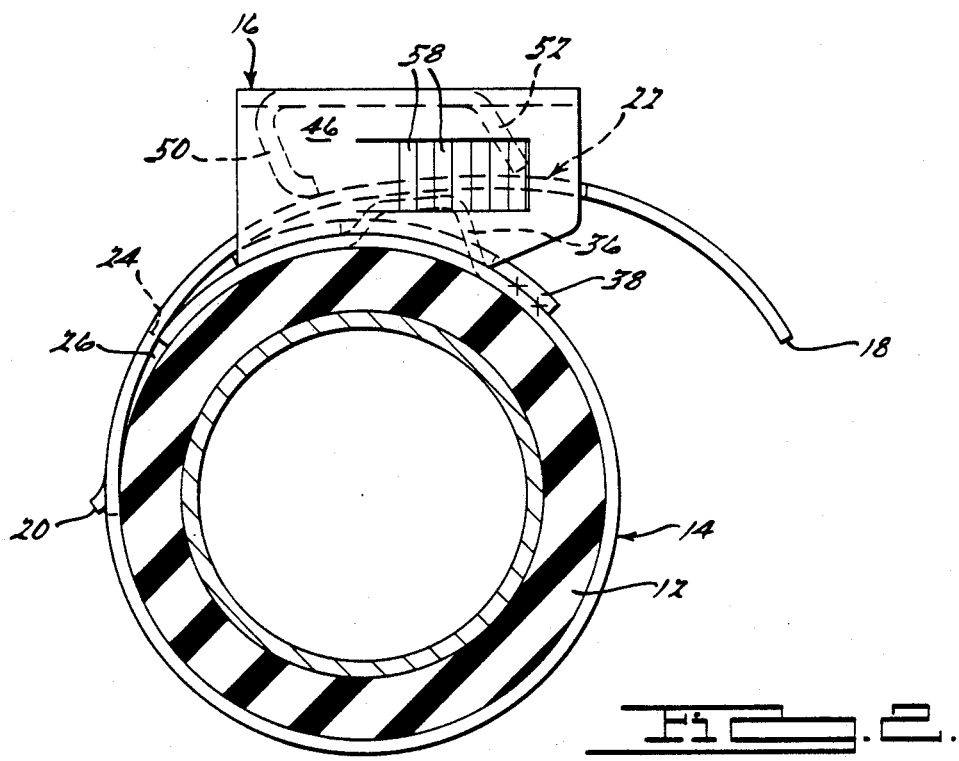
FIG. 2 is an elevation view of the hose clamp of FIG. 1.

The end 20 includes a narrowed tail portion 26 extending from the strip 14. The tail 26 passes through the aperture 24 of the strip 14 when the strip 14 is in its peripheral use position. The tail portion 26 is colinear with the longitudinal axis 25 of the strip 14. As can be seen in FIG. 2, this orientation of the strip 14 and tail 26 enables the strip 14 to circumpose the 360° periphery of the hose 12. This surrounding of the hose 12 prevents any portion of the strip 14 or housing 16 from cutting into the hose 12.

The clasp 16 includes an arcuate base 38 having an aperture 40. The aperture 40 enables the projecting finger member 36 to extend through the arcuate base 38 into the interior of the clasp 16. The base 38 is coupled to the strip 14 by welding or the like to secure the clasp 16 onto the strip 14. The clasp 16 has a housing portion 42 with a pair of side walls 44 and 46 projecting from the arcuate base 38. A top 48 spans between the two side walls 44 and 46, enclosing the clasp housing 42.

Figure 3:
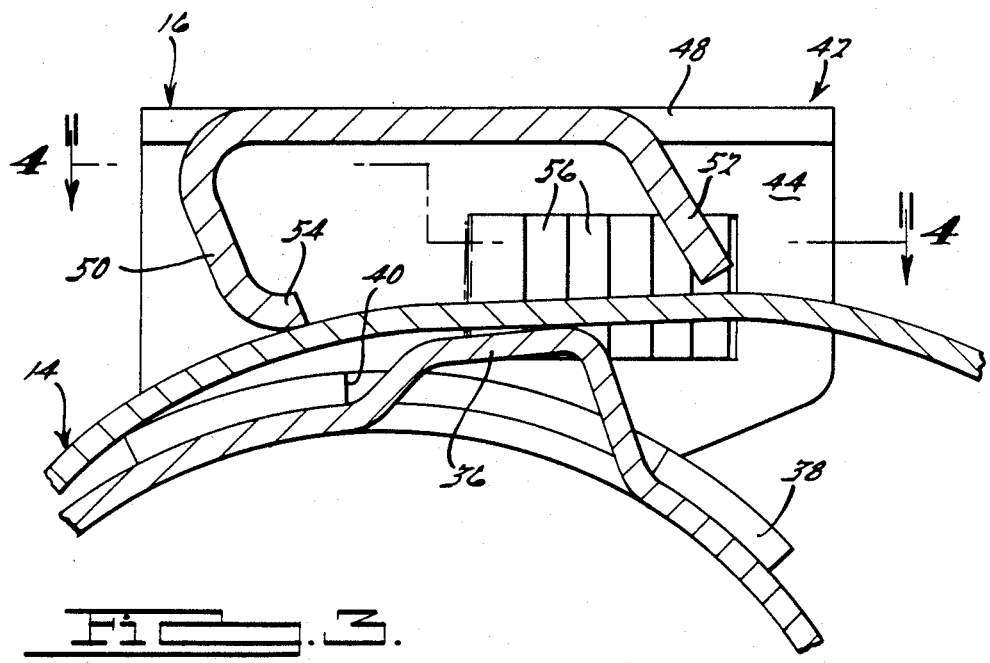
FIG. 3 is a cross-section view of FIG. 2 along line 3—3 thereof.

The clasp top 48 has a pair of projecting finger member 50 and 52. The finger members 50 and 52 depend a desired distance into the interior of the clasp 16. The finger members 50 and 52 enable the retaining portion 22 of the strip 14 to be seated within the clasp 16, as will be explained herein. The member 50 is generally bent down from the top 48 and has a curled end 54. The member 52 is generally bent down from the top 48 and is substantially planar, as seen in FIG. 3.

The side walls 44 and 46 both include barb members 56 and 58. The barb members 56 and 58 mesh with the barbs 28 and 30 of the strip retaining portion 22 to lock the strip 14 within the housing 42. The barbs 56 and 58 are cut or molded into the side walls 44 and 46 of the housing 42. The barbs 56 and 58 have a recess 60 and 61 which abuts the face 34 and 35, respectively, of the barbs 28 and 30 to lock or retain the strip 14 within the clasp 16.

Figure 4:
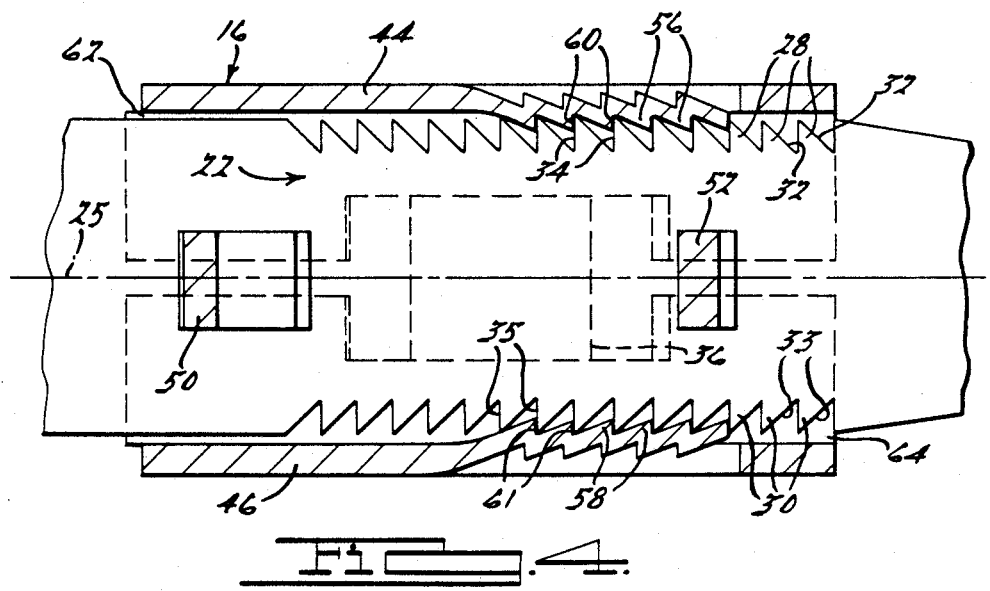
FIG. 4 is a cross-section view of FIG. 3 along line 4—4 thereof.

The strip end 18 is positioned through the opening 62 at one end of the clasp 16. The strip end 18 passes underneath projecting finger member 50, over top of projecting finger member 36 and underneath projecting finger member 52. This pass, sandwiches the strip 14 between the members 36, 50 and 52 within the interior of clasp 16. As the barbs 28 and 30 of the retaining portion 22 come in contact with the barb members 56 and 58 of the housing side walls 44 and 46, the strip 14 begins to lock within the clasp 16. As the strip 14 is pulled further through the clasp 16, more of the barbs 28 and 30 incrementally mesh or ratchet with more of the barbs 56 and 58 such that the faces 34 and 35 abut recesses 60 and 61 to lock or retain the strip 14 within the clasp 16, as seen in FIG. 4.

The above described securement maintains constant radial tension on the hose 12 via the strip 14. The clamp prohibits overtightening due to the barb design on the clasp 16 and strip 14. Also, the clamp is not susceptible to vibration when in a use position due to the barbs meshing with one another. Further, the clamp 10 is lightweight with respect to conventional screw type clamps.

To remove the strip 14 from the clasp 16 a screwdriver or the like may be used. The screw driver is inserted into the open end 64 of the clasp 16. The screwdriver or the like is positioned underneath the member 52. The strip 14 is pushed downward to release the retaining portion 22 from the barbed side wall portions 56 and 58. The strip 14 is removed from the clasp 16 and the clamp 10 is removed from the hose or the like.

While the above detailed description is well suited for the preferred embodiment, it will be understood that modifications, variations, and alterations may be made to the present invention without varying from the scope and fair meaning of the subjoined claims.

What is claimed is:

1. A hose clamp comprising:
   an elongated strip having two ends:
   a narrowed tail projection at one end of said strip and an aperture in said strip enabling said tail projection to pass through said aperture when said strip is wrapped upon itself about an article;
   a separable housing on said strip, said housing including a pair of side walls extending from longitudinal sides of said strip transverse to said strip and opposing one another, and a top spanning between said two walls enclosing the housing over said strip;
   a member projecting from said strip within said housing for seating said strip within said housing when said strip is wrapped upon itself in a use position;
   means projecting from said top of said housing for sandwiching said strip between said housing projecting means and said strip projecting member;
   one or more angular barbs on both longitudinal sides of said strip adjacent to one of said ends of said strip; and
   one or more angular barbs on each of said housing side walls for meshing with said strip angular barbs for locking said strip within said housing when said strip is wrapped upon itself in a use position.

2. The clamp according to claim 1 wherein said housing projecting means is comprised of a pair of finger members extending from said top a desired distance so that said strip is sandwiched between said finger members and said strip projecting member.

3. The clamp according to claim 1 wherein said strip is circumposed around a hose such that the strip is in contact with the hose surface around the 360° periphery of the hose.

4. The clamp according to claim 1 wherein said strip applies a constant radial force on a hose in a use position.

5. The clamp according to claim 1 wherein said housing said strip prohibit overtightening.

6. The clamp according to claim 1 wherein said housing and strip prohibit loosening due to vibration or the like.

7. The clamp according to claim 1 wherein said clamp is of a lightweight design.

8. The clamp according to claim 1 wherein said housing depending means is comprised of a pair of finger members extending from said top a desired distance into the interior of the housing so that said strip is sandwiched between said finger members and said strip projection means.

* * * * *